United States Patent
Plass et al.

(10) Patent No.: US 7,436,531 B2
(45) Date of Patent: Oct. 14, 2008

(54) SYSTEMS AND METHODS FOR USING MULTIPLE PROCESSORS FOR IMAGING

(75) Inventors: Michael F. Plass, Mountain View, CA (US); Timothy S. Diebert, Palo Alto, CA (US)

(73) Assignee: Xerox Corporation, Norwalk, CT (US)

( * ) Notice: Subject to any disclaimer, the term of this patent is extended or adjusted under 35 U.S.C. 154(b) by 707 days.

(21) Appl. No.: 10/248,610

(22) Filed: Jan. 31, 2003

(65) Prior Publication Data

US 2003/0214660 A1 Nov. 20, 2003

Related U.S. Application Data

(60) Provisional application No. 60/379,761, filed on May 14, 2002.

(51) Int. Cl.
*G06F 15/00* (2006.01)
*G06K 1/00* (2006.01)
*G06F 15/16* (2006.01)

(52) U.S. Cl. .................... 358/1.15; 358/1.1; 345/502

(58) Field of Classification Search .............. 358/1.9, 358/1.2, 3.01, 1.1, 1.11–1.18, 1.6, 403, 444, 358/450, 453; 717/119, 149; 101/116; 400/62; 345/589, 590, 530, 545, 546, 502, 520, 505, 345/506, 522; 710/71; 382/234, 304
See application file for complete search history.

(56) References Cited

U.S. PATENT DOCUMENTS

| 6,371,015 | B1 * | 4/2002 | Tomiya ................. 101/128.4 |
| 6,462,836 | B1 * | 10/2002 | Sato et al. ................. 358/3.01 |
| 6,711,998 | B2 * | 3/2004 | Hashimoto ................. 101/129 |
| 6,825,943 | B1 * | 11/2004 | Barry et al. ................. 358/1.15 |
| 6,987,585 | B1 * | 1/2006 | Becker ................. 358/1.9 |
| 2003/0107751 | A1 * | 6/2003 | Tanaka ................. 358/1.2 |
| 2004/0177776 | A1 * | 9/2004 | Hashimoto ................. 101/116 |
| 2005/0260021 | A1 * | 11/2005 | Abello ................. 400/62 |

FOREIGN PATENT DOCUMENTS

JP 09001871 A * 1/1997

* cited by examiner

*Primary Examiner*—Dov Popovici
*Assistant Examiner*—Thierry L Pham
(74) *Attorney, Agent, or Firm*—Oliff & Berridge, PLC

(57) ABSTRACT

An imaging system that uses multiple processors to process a series of print jobs to display a series of page images can include an input device that inputs an object, a controller that controls the multiple processors to process the image based on the inputted object to create the print job and an interface device that produces a plurality of worker threads that correspond to the print job. Moreover, the system can include a memory for storing the print job and an output device that displays the image. The controller controls the multiple processors and the interface device to allow the plurality of worker threads to simultaneously process independent portions of the print job even when regions associated with the image overlap.

14 Claims, 12 Drawing Sheets

SYSTEMS AND METHODS FOR USING MULTIPLE PROCESSORS FOR IMAGING

INCORPORATION BY REFERENCE

This nonprovisional application claims priority under 35 U.S.C. § 119 of U.S. Provisional Application No. 60/379,761 filed on May 14, 2002, and entitled "Effectively Using Multiple Processors For Page Rendering." The provisional application is incorporated herein by reference in its entirety.

BACKGROUND OF THE INVENTION

1. Field of the Invention

The present invention relates to imaging systems and methods.

2. Description of the Related Art

In the context of the present invention, the term imaging is to be taken to mean the production of a digital representation of a page image, typically in preparation for printing or display. The same term is also commonly used to refer to methods of image capture, methods of image display, and methods of printing, but these of only peripherally related to the present invention. Currently, imaging systems are used in a wide variety of fields. An imaging system can include a suite of integrated imaging software that provides high-speed, two-dimensional rendering capabilities for other software programs that require graphics output, such as page description languages (PDL) and interactive graphical editors. Many of these types of imaging systems are designed to be open-ended and device-independent, so that the imaging system can support a wide variety of input data streams and output devices. For example, some imaging systems can simultaneously provide imaging services to more than one application program and/or more than one physical output device.

Computer programs are commonly designed to be executed in a step-by-step fashion, with instructions logically being performed one at a time. Modern operating systems allow multi-threaded processing, in which several threads of control proceed in parallel, largely independently of each other. Each such thread acts, from the programmer's point of view, as a conventional, serial, computer. The actual processor or processors are multiplexed among the threads to provide this illusion. A multithreaded program, if running on a computer having multiple processors, can run faster than on a single-processor computer, because the operations can take place in parallel.

Currently, imaging systems can support full-color printing for high-speed printing engines. These printing engines are capable of full-color printing, for example, at 40 or 60 pages per minute. The controller for the print engines can be a computer workstation containing multiple processors, which may provide a performance advantage if there are multiple threads, as discussed above. But the instructions for producing a given page image are typically performed serially, or in a pipelined fashion where each thread is responsible for a certain stage of processing.

Because the processing capability of the print engines continues to increase to higher speeds, there is a need for an imaging system that will more precisely control the multiple processors and multiple worker threads to further increase print speed, even when regions within a page image overlap.

For pages of text and for synthetic images in which imaging regions that include graphic elements do not overlap, the imaging process is less complex. On the other hand, when there is overlapping between imaging regions, imaging system cannot efficiently parallel process the threads of information that need to be processed to create the image. Consequently, because it is quite common in current imaging systems for imaging regions of an image to overlap, parallel processing can be degraded or prevented when using conventional imaging systems and methods.

Based on the problems discussed above, there is a need for imaging systems and methods that allow better utilization of hardware systems with multiple processors to speed the production of page images. The imaging system needs to be capable of using multiple worker threads simultaneously within a certain print job even when regions of the image overlap. For example, the imaging system needs to perform parallel processing that allows multiple execution threads to process independent portions of a same page of a single print job simultaneously when the overlapping regions exist.

SUMMARY OF THE INVENTION

This invention provides imaging systems that can rapidly process information for high-speed print engines.

The invention further provides imaging systems and methods that more effectively control multiple processors through parallel processing to increase print speed, while simultaneously providing rapid imaging services to multiple application programs so that each print job can be more efficiently managed without degrading the worker thread processing capabilities even if regions overlap.

The invention separately provides imaging systems and methods that simultaneously use multiple execution threads within a single print job in order to parallel process independent portions of a same page of a single print job, and which allow one thread to image one type of print job while another thread images another type of print job.

In various exemplary embodiments of the imaging systems and methods according to the invention, an imaging system that uses multiple processors to process a print job to display an image can include an input device that inputs an object, a controller that controls the multiple processors to process the image based on the inputted object to create the print job and an interface device that produces a plurality of worker threads that correspond to the print job. Moreover, the system can include a memory for storing the print job and an output device that displays the image. The controller controls the multiple processors and the interface device to allow the plurality of worker threads to simultaneously process independent portions of the print job even when regions associated with the image overlap.

BRIEF DESCRIPTION OF THE DRAWINGS

These and other features and advantages of this invention are described in, or are apparent from, the following detailed description of various exemplary embodiments of the systems and methods according to this invention, wherein like numerals reference like elements, and wherein.

DETAILED DESCRIPTION OF PREFERRED EMBODIMENTS

In imaging systems, imagers can be used to facilitate communications between various devices. The imager can include multiple levels that present a set of standardized interfaces through which applications and other levels of the imaging system can request services.

Figure 1:
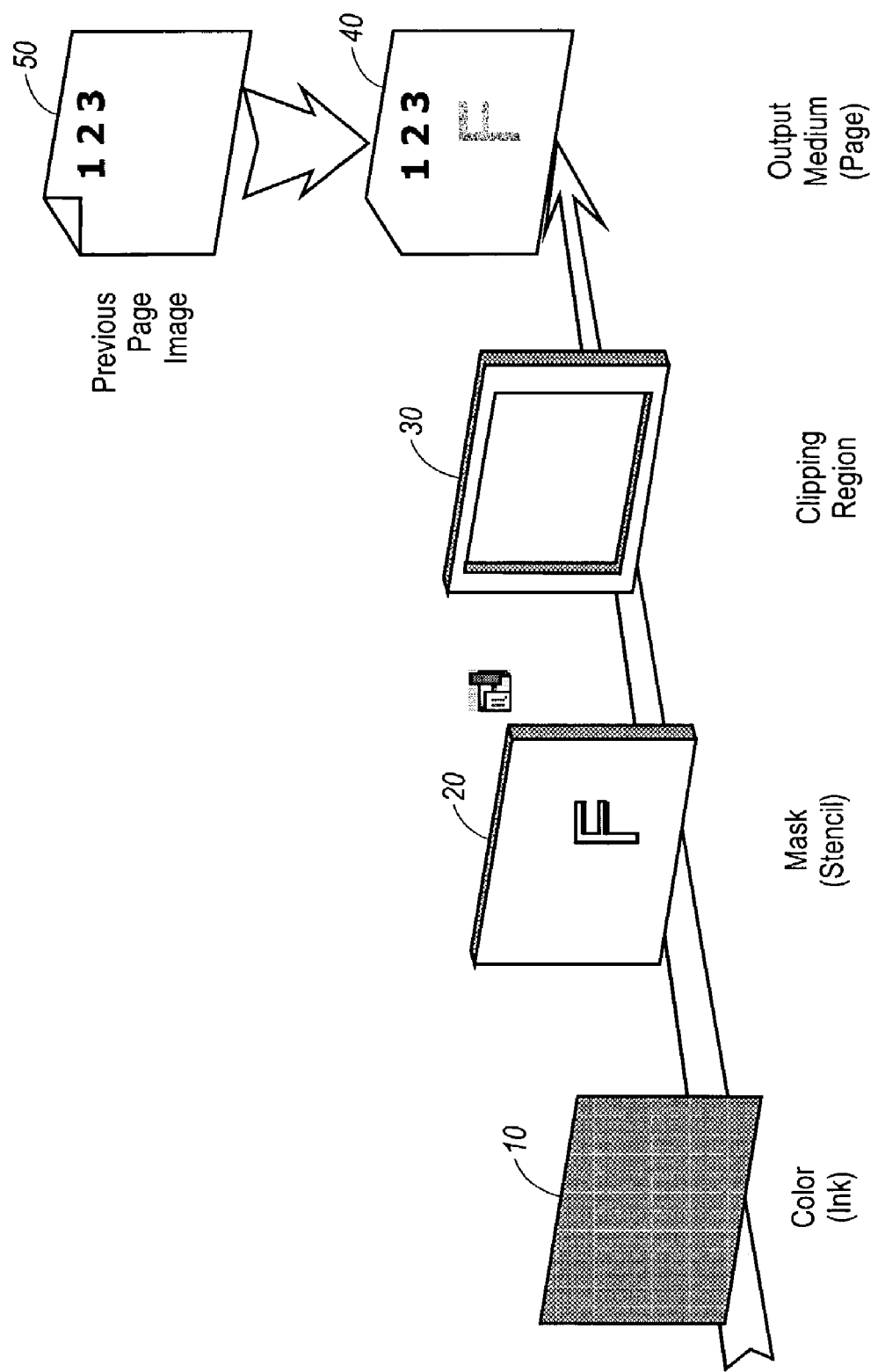
FIG. 1 is an exemplary diagram of a stencil printing method that can be used according to the systems and methods of the invention.

FIG. 1 shows an exemplary diagram of imaging using a stencil printing technique that can be used with the systems and methods according to the invention. In FIG. 1, each graphic element (i.e., character, line, drawing or photographic image) is sequentially printed on a page by metaphorically forcing an ink 10 through a mask or stencil 20 that conforms to an outline of the graphic element. The ink 10 can applied as a solid color, a pattern or even a half tone image. Thus, a complete page is created in a step-by-step process as each graphic element is printed in sequential order, with the more recent graphic element, which is usually an opaque element, covering any previous graphic element that it overlaps.

An important part of this technique is a separation of the imaging task into two basic subtasks: (a) stencil creation and placement; and (b) inking. In color imaging, the inking sub-task consumes a large percentage of the overall processing time, in part because the large number of bits that must be generated for a color image. Accordingly, as will be discussed later, the stencil creation and placement sub-task and the inking sub-task can be separated by using multiple processors in order to deal with the large processing time for inking.

Figure 2:
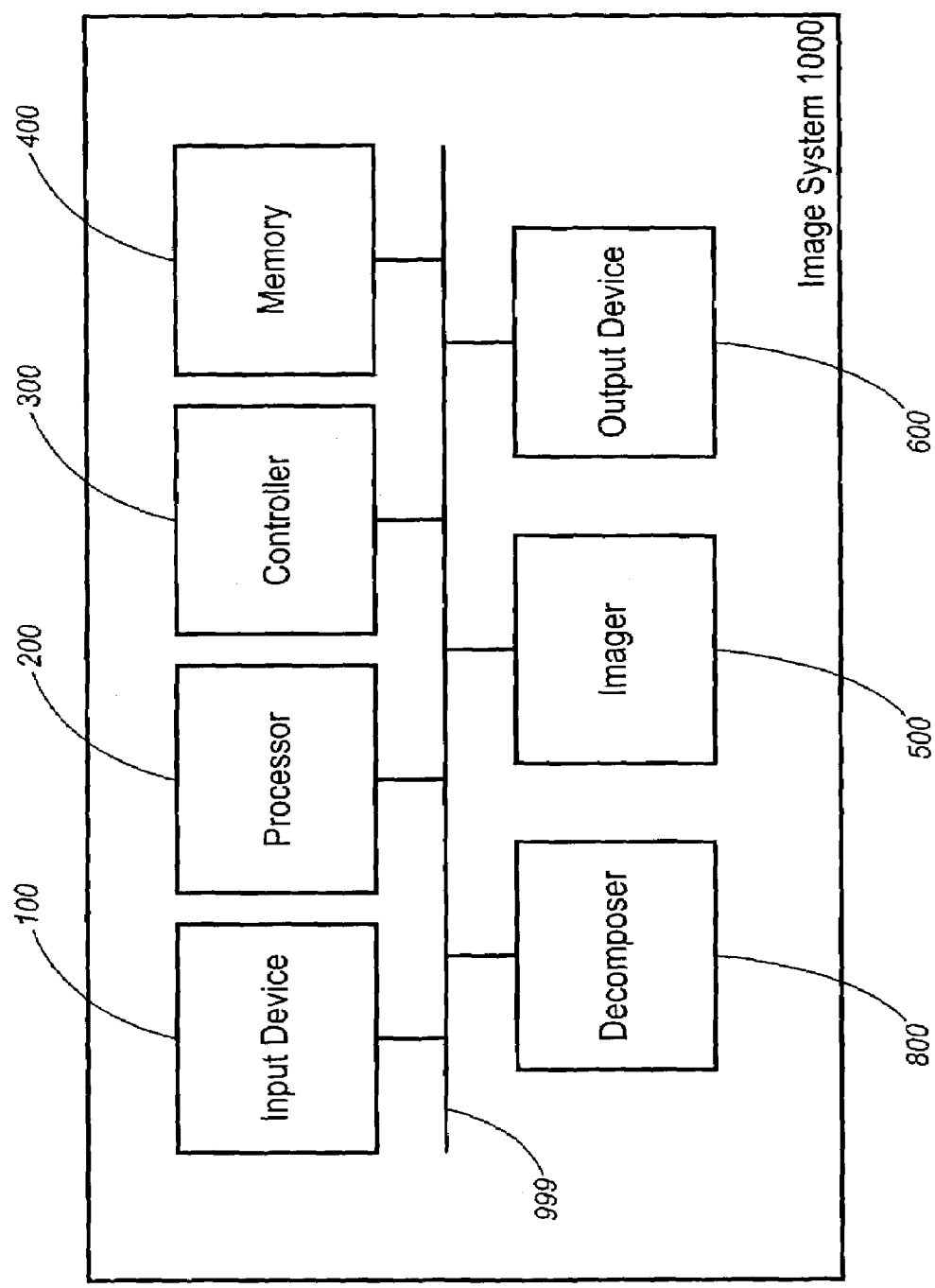
FIG. 2 is an exemplary block diagram of an imaging system that can be used according to the systems and methods of the invention.

FIG. 2 is an exemplary block diagram of an imaging system 1000 that can be used according to the systems and methods of the invention to perform, for example, the printing technique shown in FIG. 1. In FIG. 2, components of an imaging system 1000 are shown such as an input device 100, a processor, 200, a controller 300, a memory 400, an imager 500 and an output device 600. The components can be interconnected by a common bus 999.

The input device 100 can be any device which allows electronic page descriptions, created externally to the system, to be accepted as input into the imaging system 1000 and processed. For example, a scanner can be used to scan an object to create an electronic image, whereby the resulting electronic image of the scanned object is input into the imaging system 1000 for processing. Moreover, the input device can be a computer that allows electronic page descriptions to be automatically or manually created, or a network connection to other computer systems.

The processor 200 can be a general purpose processor or a single special purpose integrated circuit (e.g., ASIC) having a main or central processor section for overall, system-level control, and separate sections dedicated to performing various different specific computations, functions and other processors under the control of a central processor section. The processor 200 can also be multiple processors, a plurality of separate dedicated or programmable integrated or other electronic circuits or devices (e.g., hard wired electronic or logic circuits such as discrete element circuits, or programmable logic devices such as PLDs, PLAs, PALs or the like). The controller 300 can be any device that controls each of the components of the imaging system 1000 so that an object can be imaged, processed and output through the output device 600. For example, the controller can be a circuit or a routine. The controller can be suitably programmed for use with a general purpose computer, e.g., a microprocessor, a microcontroller or other processor device (CPU or MPU), either alone or in conjunction with one or more peripheral (e.g., integrated circuit) data and signal processing devices. In general, any device or assembly of devices on which a finite state of machine capable of implementing the procedures described herein can be used as a controller. A distributed processing architecture can be used for maximum data/signal processing capability and speed. While the embodiments shown below use multiple processors, any processing and controlling circuit or routine can be used without departing from the spirit and scope of the invention.

The memory 400 can be any device that stores data or information for the imaging system 1000.

The output device 600 can be any device that can display an image stored in the memory or a page buffer. For example, the output device 600 can receive the electronic image from the page buffer and produce an image so that the electronic image can be printed or displayed. For example, the output device 600 can be a printer that prints an image of a scanned object. Furthermore, the output device can be a display used to display an electronic image of a scanned object so than an operator can view the electronic image. The output device 600 can be any other device that provides an image of the object that was input and converted into an electronic image by the imaging system 1000.

Although the components of the imaging system 1000 previously discussed are shown for example purposes only, it should be appreciated that the systems and methods according to this invention can be used with any components of imaging systems, and using more or less components, without departing from the spirit and scope of the invention.

In the imaging system and methods according to the invention, various decomposers 700 can interpret different commands in a document and ultimately create a set of page buffers that are sent to output devices. The page buffers can be multiple page buffers. For example, the decomposers 700 can interpret PDL commands in a document inputted from a computer and create a set of empty multiple page buffers that are sent to the imaging system 1000. The decomposers 700 then send signals to the imaging system 1000 to perform actual imaging commands and to fill the multiple page buffers. The decomposers 802 and 804 in FIG. 3 (which can correspond to Interpress and Postsript decomposers for example purposes) can communicate with the imaging system 1000 using calls to the imager 500. However, it should be appreciated that any type of decomposer can be used according to the invention without departing from the spirit and scope of the invention.

Figure 3:
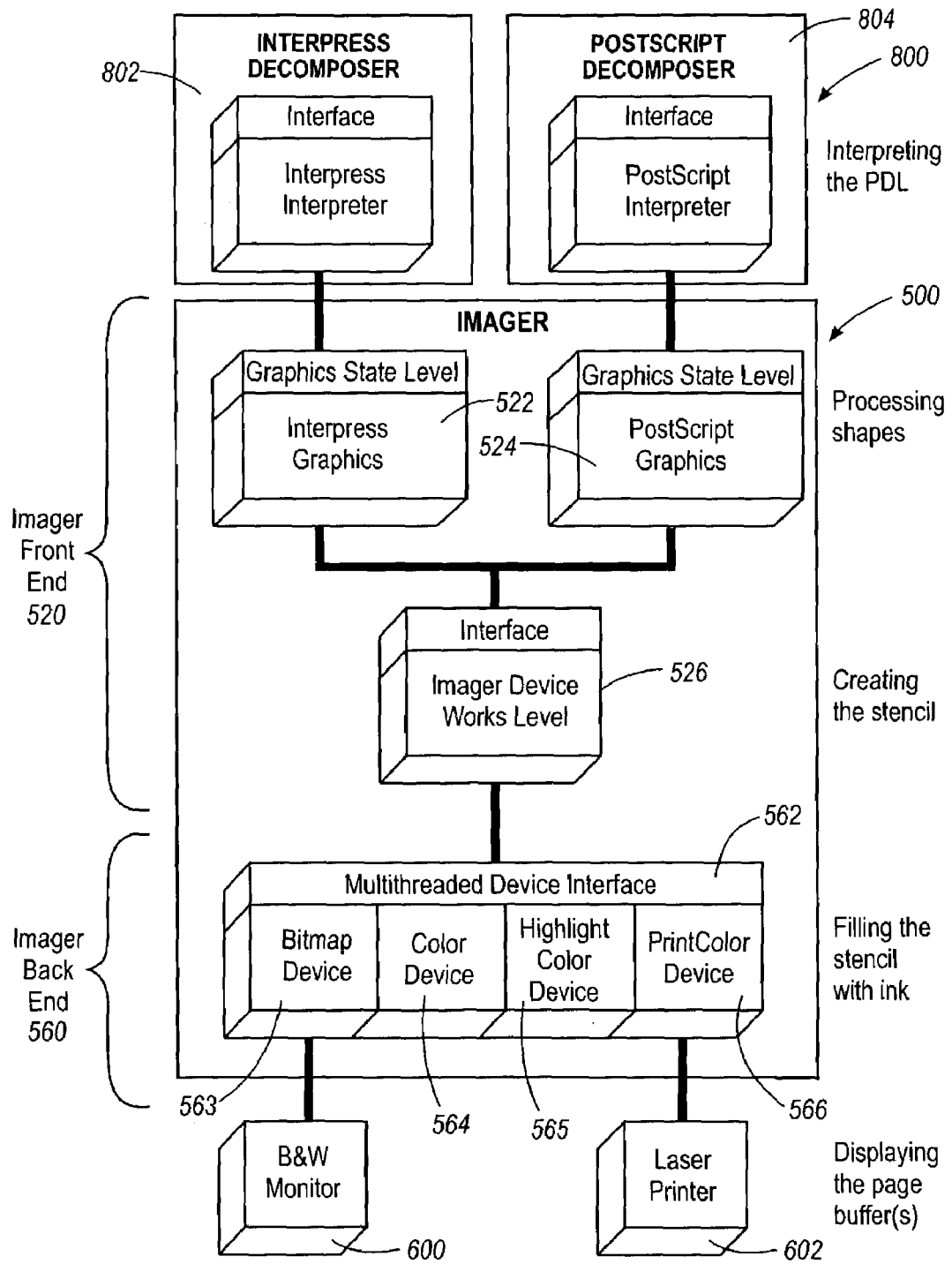
FIG. 3 is an exemplary detailed block diagram of an interface device that can be used as part of the imaging system of FIG. 1.

FIG. 3 shows an more detailed exemplary block diagram of an interface device 500 that can be used in the imaging system 1000 according to the invention. In FIG. 3, the interface device is shown as an imager 500 that includes various levels and interfaces. For example, the imager 500 can include multiple levels that present a set of standardized sub-interfaces through which applications and other levels of the imaging system can request services. An imager front end 520 of the imager 500 can process device and resolution independent requests. Moreover, an imager back end 560 of the imager 500 can convert those requests into resolution-specific and device-specific output signals. Together, the graphics state levels 522 and 524 and the imager device works level 526 constitute the imager front end 520 of the interface device 500. The multithreaded device interface 562 is the imager back end of the interface device 500. Each level within the imager 500 presents a set of standardized public interfaces through which applications, for example, DocuPrint decomposers, and other levels of the imaging system can request services.

For convenience of this discussion, the imager 500 used in the systems and methods according to this invention will use Interpress and PostScript graphics state levels 522 and 524 that can contain a graphics tool kit to provide a complete set of imaging primitives that support the imaging of any two dimensional image. However, it should be appreciated that any graphics tool kit can be used according to the invention without departing from the spirit and scope of the invention. The graphics state levels 522 and 524 process shapes that correspond to the graphic elements discussed above. After the graphic state levels 522 and 524 process the graphic elements, an imager device works level 526 is used to create the stencil or mask that defines the outline of the graphic element in the page buffer. Moreover, the imager device works level 526 turns the resolution-independent graphics input from the decomposers 802 and 804 into resolution-specific output suitable for the imaging system 1000.

The multithreaded device interface 562 provides an sub-interface that creates tailored output for specific output devices 600 and 602 that can range from disk files, monitors, screens, laser printers, etc. These output devices 600 and 602 are shown in FIG. 3 as a black-and-white monitor and a laser printer which can be used to display the page buffer. Because color capabilities can differ among output devices, the multithreaded device interface 562 contains code that controls rendering of color during the inking task. Any changes to support multiple threads in the imaging system 1000 are all implemented at the multithreaded device interface 562 as a new multi-threaded device. The multithreaded device interface 562 can further include separate devices to fill the stencil with ink such as a bitmap device 563, color device 564, highlight color device 565 and a print color device 566.

Figure 4:
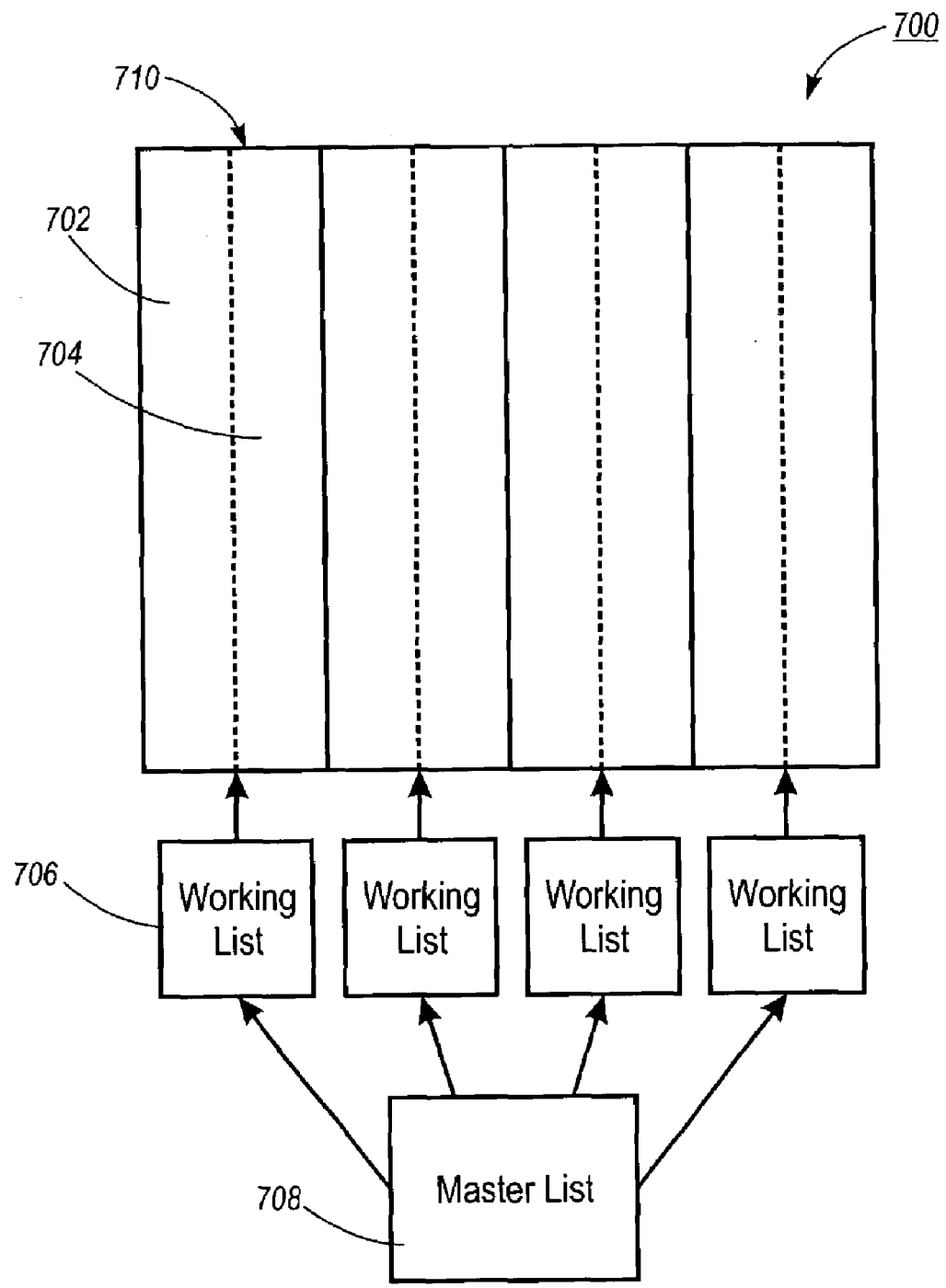
FIG. 4 is a exemplary diagram showing a method of parallel processing.

When improving the performance of imaging systems by using multiple worker or worker threads in a same imaging system, there are a different approaches to parallel processing on a single page of a job that can be used. FIG. 4 is an exemplary diagram showing a method of parallel processing that can be used with imaging systems. Under a method using independent image bands, and as shown in FIG. 4, the imager 500 can divide a single page into bands 710, where each band 710 is composed of a set of neighboring scan lines 702 and 704, and where adjacent bands do not overlap. The imager 500 divides the page into an arbitrary number of bands 710, with significantly more bands than threads working on the bands 710. The imager 500 associates a working list 706 with each band 710.

For each page, the imager 500 makes a master list 708 of outstanding tasks and moves each task from the master list 708 onto the working list 706 that corresponds to each band 710 that the task affects. For imaging commands that would affect multiple bands, the imager 500 creates multiple tasks for the corresponding band. However, each multiple task only affects each corresponding band. The imager 500 also ensures that each band 710 and the corresponding working list 706 is appropriately ordered from the master list 708 to preserve the order of the requests for various pieces of the image. Once the imager 500 finishes filling the work lists 706 for a page, the threads (or worker threads) within the imager 500 process the working list 706 for each band 710 one at a time. Because the bands 710 do not overlap, and the work list tasks always affect only a single band, the worker threads do not interfere with each other.

This method of parallel processing does not require that the worker threads directly fill a page buffer. The worker threads can instead create some arbitrary data structure which can be later interpreted by the imaging system. For example, the method can be controlled to simultaneously create all of the bands 710 and the work lists 706 for an entire page at once. Then, only after all of the work lists 706 have been created do the worker threads perform low-level imaging. Accordingly, this method requires a process of controlling available storage for filling before the imager 500 has finished creating the work lists 706.

In various exemplary embodiments according to the invention, the method of parallel processing can use a color separation technique. For full-color printing, the imaging system 1000 may be able to parallel process its work by color separating each worker thread. For example, a single page buffer may consist of a varying number of separate worker threads so that a page buffer for a color page has four separate worker threads (one for each of cyan, magenta, yellow and black), while a page buffer for a black-and-white page only has two worker threads.

Using this method, filling in the bits for one color separation never interferes with filling in the bits for another color separation so that the threaded process is not jeopardized. Moreover, two worker threads working on different color separations can never interfere with each other because each worker thread completely processes every page, but fills only one color separation of either cyan, magenta, yellow and black for each page. Because each worker thread writes in a different area of memory that corresponds to one of the colors, this method can work well even if the worker threads run on different imaging systems or if the imaging system's memory does not have good band-width characteristics.

In various exemplary embodiments according to the invention, another method of parallel processing can use page boundaries. With this method, the imaging system 1000 can parallel process its work along page boundaries. For page independent PDLs, working on one page is guaranteed not to interfere with working on another page. Accordingly, each worker thread can safely perform all processing for a particular page while the other worker threads work on different pages.

Finally, in various exemplary embodiments according to the invention, still another method of parallel processing can use each worker thread to execute a command for some region of the same page at the same time as other worker threads execute commands in other regions. In this method, each worker threads simultaneously write into the same physical page buffer even though each worker thread works on all separations at once. In order to ensure that worker threads do not interfere with each other, the imaging system 1000 can maintain an ordered pool of tasks to perform. An individual worker thread can then select work units that do not interfere with other processing that is taking place at the same time.

With reference to FIG. 3, the multithreaded device interface 562 in the imager 500 is used to control multiple processors available with a controller. The multithreaded device interface 562 is used to perform coordination while farming out actual imaging work to multiple worker threads. Both the imager front end 520 and the imager back end 560 work together in a single producer thread to create low-level imaging requests. The multithreaded device interface 562 organizes the creation and processing of the separate worker threads to perform those requests.

Although the graphics state levels 522 and 524 perform all of the shape (stencil) processing, the multithreaded device interface 562 can copy data that must be available when a worker thread finishes processing a unit of work, organize units of work into an ordered pool, create worker threads or wake up sleeping worker threads as needed and perform some optimizations of entries in the work pool.

Each worker thread can select a work unit from the pool created by the multithreaded device interface 562, does the required processing, i.e., filling in the stencil with either a solid color, pattern or image, can remove the finished unit from the work pool, can determine if there is any other task to perform and either performs the task or goes to sleep. Each worker thread uses a separate instance of one of the devices within the multithreaded device interface 562, i.e., the bitmap device 563, color device 564, highlight color device 565 and a print color device 566 to actually execute the command associated with the work unit and fill the stencil with ink. The type of device to use within the multithreaded device interface 562 is communicated to the multithreaded device interface 562 from the imaging system front end 520 and is the same for all workers. The devices within the multithreaded device interface 562 then forwards the information into an output device 600 and 602.

For example, using multiple processors and the controller as described above, the imaging system 1000 of the claimed invention can use a producer/worker model of imaging. Specifically, imaging system 1000 can use one thread for a producer of data and four threads for the individual workers to process the data. When the multithreaded device interface 562 first begins working on a print job, the multithreaded device interface 562 creates work units and puts the work units in a work pool. The multithreaded device interface 562 then also creates the worker threads, placing the worker threads in a condition to immediately to request work units. Then, the multithreaded device interface 562 can, if required, wake-up an idle worker thread when it adds a new work unit, so that the work unit can be immediately processed.

The information contained in each work unit can be information involving a shape or use, whereby a list of boxes in device coordinates (which are aligned to a page buffer) or a list of raw bitmaps (which can typically be characters from a font) is used. The information can also include a bounding box of that shade, a constant or sample color to use plus associated halftoning and color correction information. Finally, the information contained in each work unit can include an associated page buffer, because, at a given time, the work pool can contain work units that apply to multiple pages where each work unit needs to identify the page to which it belongs.

Figure 5:
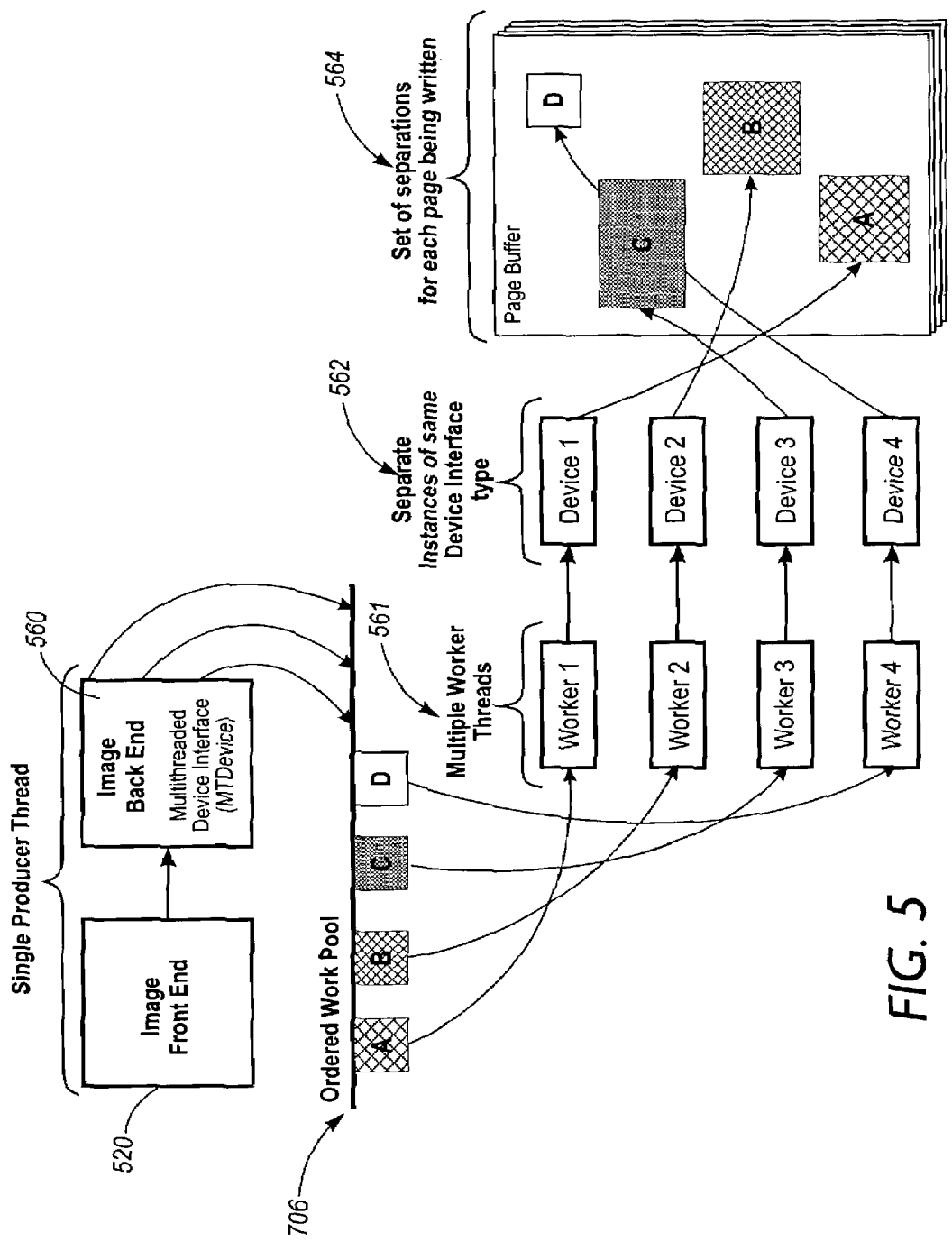
FIG. 5 is an exemplary diagram showing a method of parallel processing using multiple processors according to the systems and methods of the invention.

A work unit can be a task such as "render bits for the red rectangle at these coordinates." The producer thread adds new work units to the pool in order of the imaging commands in the document. This process ensures that if the shape specified by two work units overlap, the correct image ends up on top. The worker threads try to remove work units from the working list in a given order. FIG. 5 is an exemplary diagram showing a method of parallel processing using multiple processors according to the systems and methods of the invention. As shown in FIG. 5, the multithreaded device interface 562 coordinates traffic between the imager front end 520, the imager back end 560, the work units A-D and the worker threads 561. As previously discussed, the multithreaded device interface 562 farms out actual imaging work to the multiple worker threads 561. Then, each worker thread 561 searches for a work unit 706 that includes tasking to process in order to create the image. The worker threads 561 in FIG. 5 can select the work units A-D in the worker pool list. If none of the tasks associated with the work units in the pool overlap, this procedure can be successful in assigning all work units 706. If there are overlaps in the tasking, however, the worker thread must perform a more complex analysis.

As shown in FIG. 5, a worker 1 of the worker threads 561 has a first task selecting a work unit A-D from the pool so that the work can be processed. Then a tailored output is sent to the specific output devices discussed earlier that can range from disk files, monitors, screens, laser printers, etc, and then to a page buffer 564. These output devices 562 are shown in FIG. 5 as devices 1-4. Selecting a work unit A-D is less complex when no two distinct imaging commands for a page affect the same region of the page, or overlap. As can be seen in the page buffer 564, no regions within the page buffer 564 overlap. In this case, all of the processing can be done in parallel without any interference between the worker threads 561. This scenario can occur, for example, with a page containing only text. In this situation, the worker threads 561 process the work units A-D in the exact order they appear in the work pool.

Figure 6:
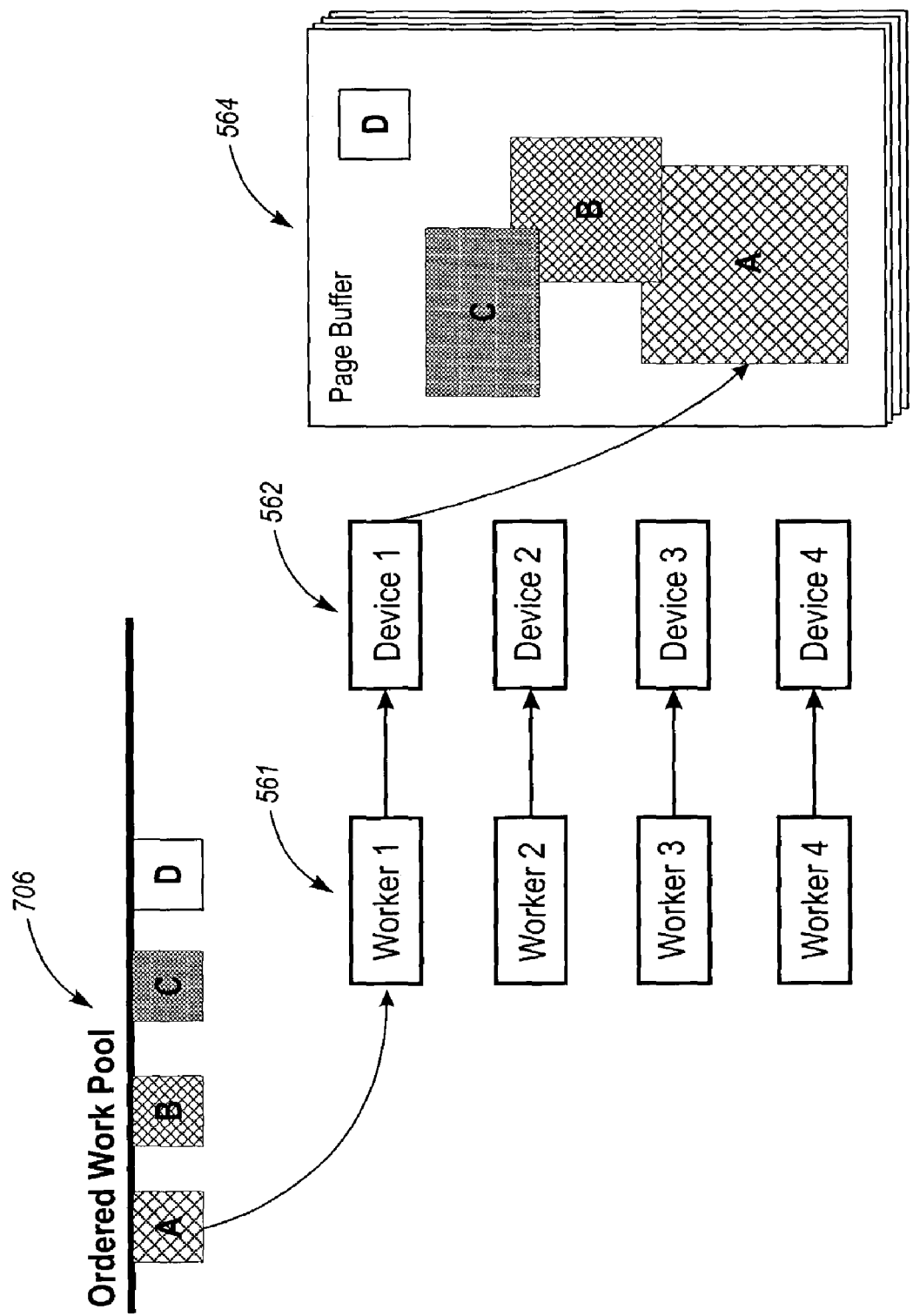
FIG. 6 is an exemplary diagram showing the method of parallel processing using multiple processors according to the systems and methods of the invention.
Figure 7:
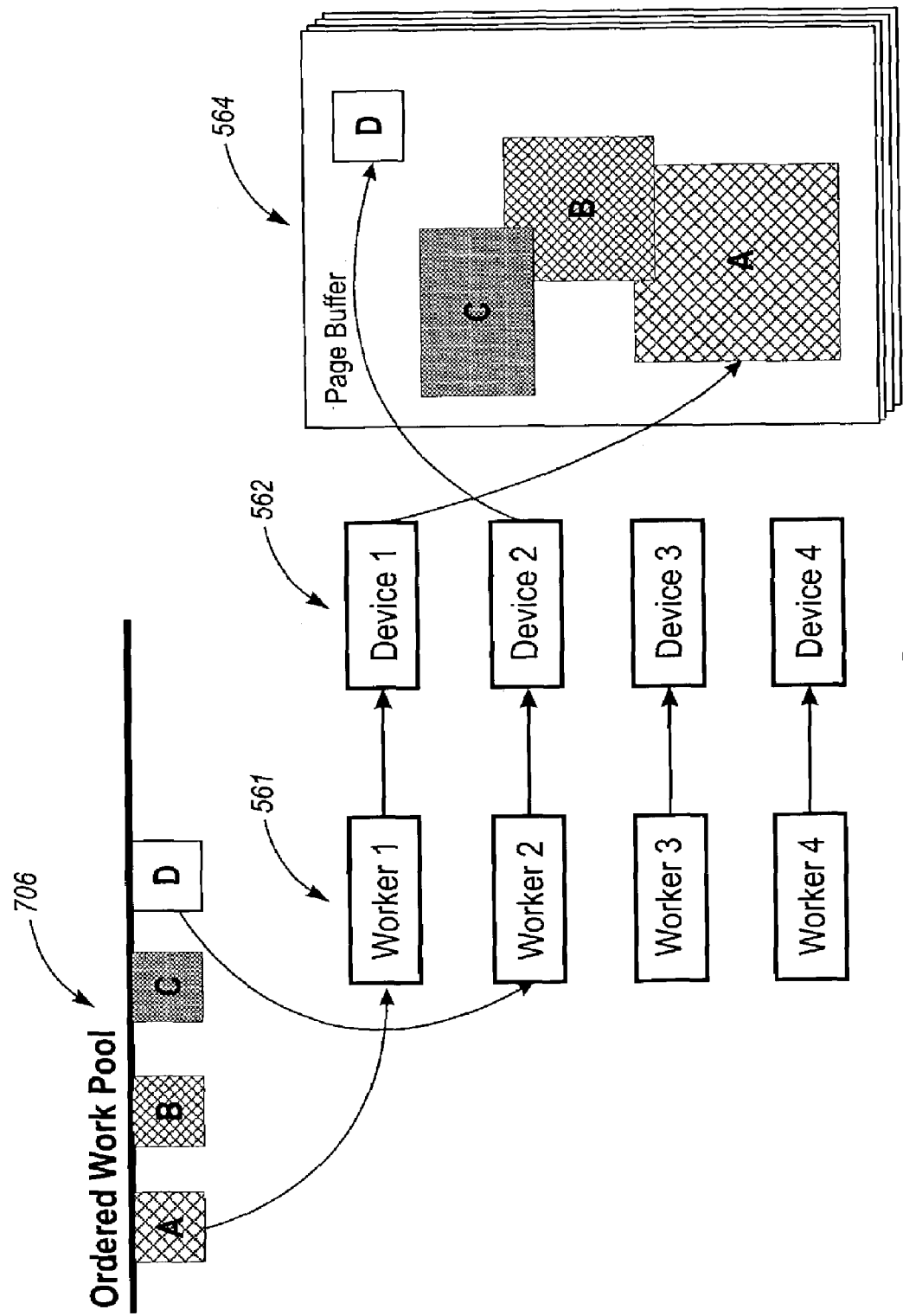
FIG. 7 is another exemplary diagram showing the method of parallel processing using multiple processors according to the systems and methods of the invention.

In many situations, however, the regions associated with multiple work units A-D overlap. When there are overlapping regions, selecting a unit to process can be more complex. Accordingly, FIGS. 6-7 are exemplary diagrams expanding on the method of parallel processing using multiple processors that can be used according to the systems and methods of the invention. For this example, it will be assumed that four worker threads 561 are idle and the only tasking in the work pool exists in the work units A-D. For worker 1 of the work units 561, the situation is straightforward in determining which work unit A-D to select. None of the worker threads 561 have begun processing any of the tasking in the work pool, so the worker 1 selects the first work unit in the pool which is the work unit A. Then, a tailored output is sent to device 1 of the output devices 562 so that the region A corresponding to the work unit A can be stored in the page buffer 564. The work unit A remains in the work pool, with an annotation that it is currently being processed by the worker 1.

Next, as shown in FIG. 7, worker 2 of the worker threads 561 begins the process and considers selecting the work unit A. However, because the work unit A has already been selected by the worker 1, the worker 2 considers selecting work unit B. However, the region B associated with the work unit B in page buffer 564 overlaps that of the regions A associated with the work unit A. Therefore, the worker 2 disregards the work unit B in the work pool and instead considers work unit C. However, a similar problem exists in that region C associated with the work unit C overlaps that of the region C associated with the work unit B. Although the work unit B has not been processed, the worker 2 disregards the work unit C and instead considers the work unit D. The work unit D does not overlap any other region A-C, so the work unit D is processed by the worker 2.

Next, worker 3 begins the same process, and discovers that a problem exists in that there are no available work units A-D that can be processed because the remaining regions associated with the remaining work units overlap each other in some capacity. Thus, in various exemplary embodiments, the systems and methods according to the invention solve this problem by providing a method that can perform imaging without jeopardizing the imaging process even when overlapping is common. This method uses a technique of creating regions by sweeps and sampled images. The sweeps define a region of gradual color variation. For example, assuming a user desires a page that is blue at a top shading to be white at the bottom, the method can use strips of color that gradually change from blue to white and which frequently overlap by a small amount.

Figure 8:
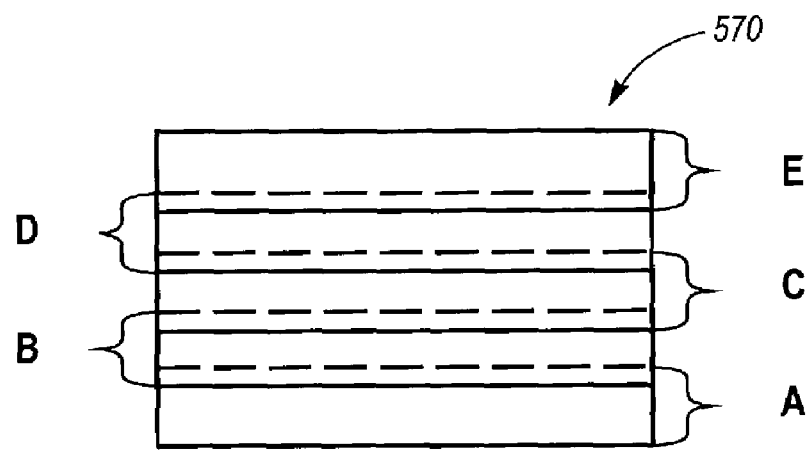
FIG. 8 is an exemplary diagram showing first overlap regions that can be created by output devices used in accordance with the systems and methods of the invention.

FIG. 8 is an exemplary diagram showing the overlap regions discussed above that can be created by output devices used in accordance with the systems and methods of the invention. The regions in FIG. 8 can be created by using strips of colors that gradually change from one color to another, and which frequently overlap by a small amount. For large sampled images such as scanned photographs, the image system 1000 in accordance with the claimed invention can divide the large sampled image into strips so that it can more easily process smaller quantities of the image data. Although these strips may not actually overlap, the image system 1000 can still process the strips as though they do overlap. In some instances, once a first worker thread from the worker threads 561 begins to process a first region, no other worker thread can begin to process any other region until the first worker thread has completed processing the region. In this situation, the parallel processing can be detrimentally effected.

However, based on the parallel processing shown in FIGS. 6-7, although region C is blocked while a worker thread processes region A, region C actually does not overlap region A. Regions A and C are also shown in FIG. 8 as strips which are independent of each other. However, the problem is that region C overlaps region B and therefore may not be processed before region B. If region B is processed after region C, then region B will appear to be on top of region C in the overlapping portion instead of region C being on top of regions B.

Figure 9:
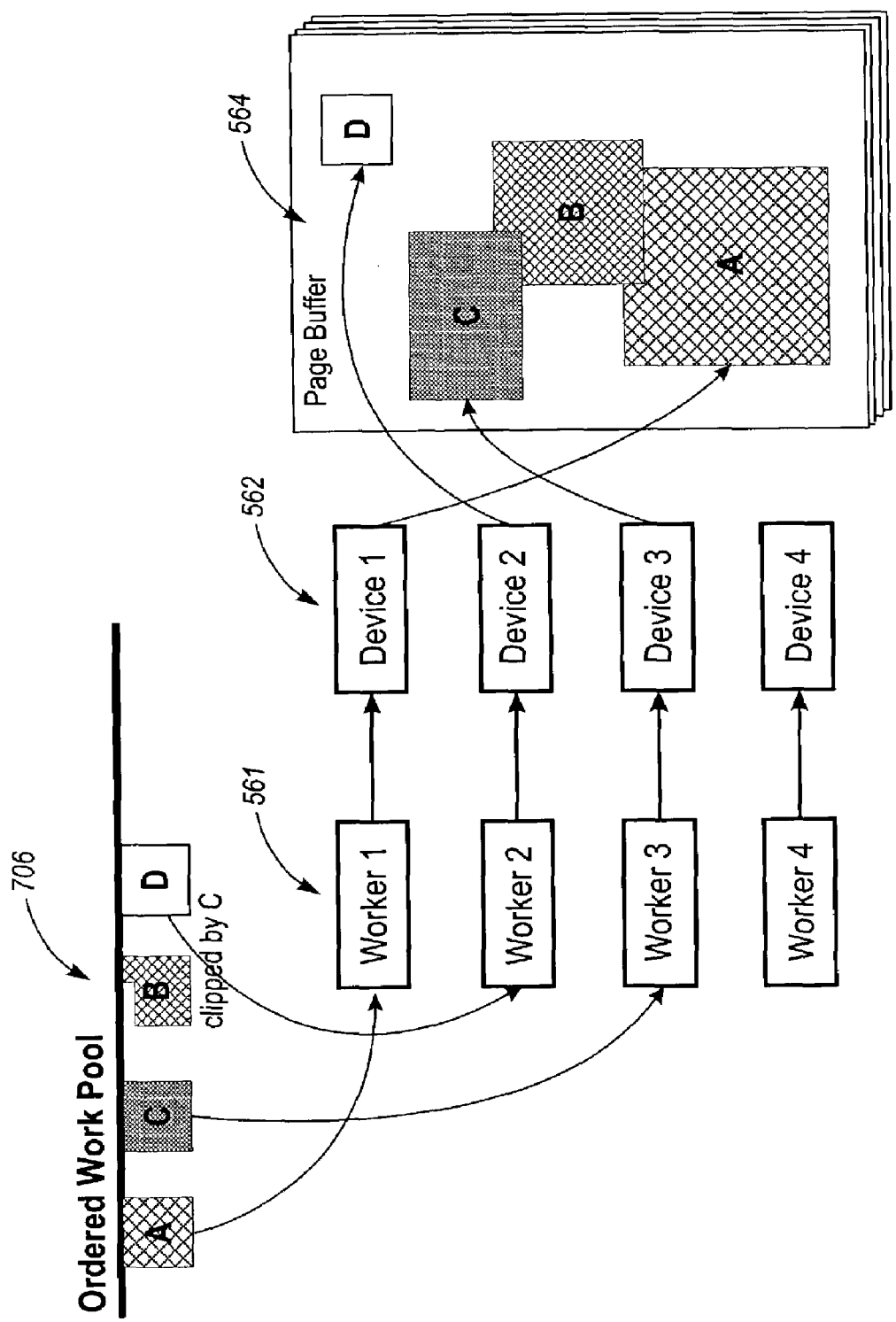
FIG. 9 is an exemplary diagram of the method of parallel processing using multiple processors that can be used according to the systems and methods of the invention.

FIG. 9 is an exemplary diagram of the method of parallel processing using the sweeps and sampled images that can be used according to the systems and methods of the invention. In FIG. 9, when the worker 3 is searching for a work unit A-D to process, the worker 3 searches through the work pool that includes work units A-D. Then, the worker 3 starts over at the beginning of the work pool. However, according to this embodiment, the worker 3 now searches the work units A-D to determine whether there are two adjacent work units in the pool which are not currently being processed by a worker thread 561 and which, if reordered, would result in it being possible to process a another work unit A-D. The worker 3 determines that work units B and C are adjacent work units which are not currently being processed by a worker thread. Thus, the worker 3 will attempt to reorder to work pool consisting of work units A-D so that another work unit can be processed even though the regions in the page buffer overlap.

In addition to reordering the work pool, the worker 3 can change the shape associated with the work unit B to subtract out a portion overlapped by the work unit C. In this process, when a later worker thread selects the work unit B, the worker thread will not image that portion a second time. Next, worker 4 now searches for a work unit A-D to process, and determines that there are no available work units. In other words, the work units A, C and D are all being processed and work unit B cannot be processed until the worker 1 is finished processing the work unit A. Thus, worker 4 can go into a sleep mode because there is nothing else to process.

The image system can be controlled to that the imaging system 1000 never tries to process a work unit whose region directly overlaps another region that is concurrently being processed. When a worker thread selects a work unit whose region overlaps another region, as discussed above, the worker thread can change the shape of the overlapped region so that a work unit can be processed.

Figure 10:
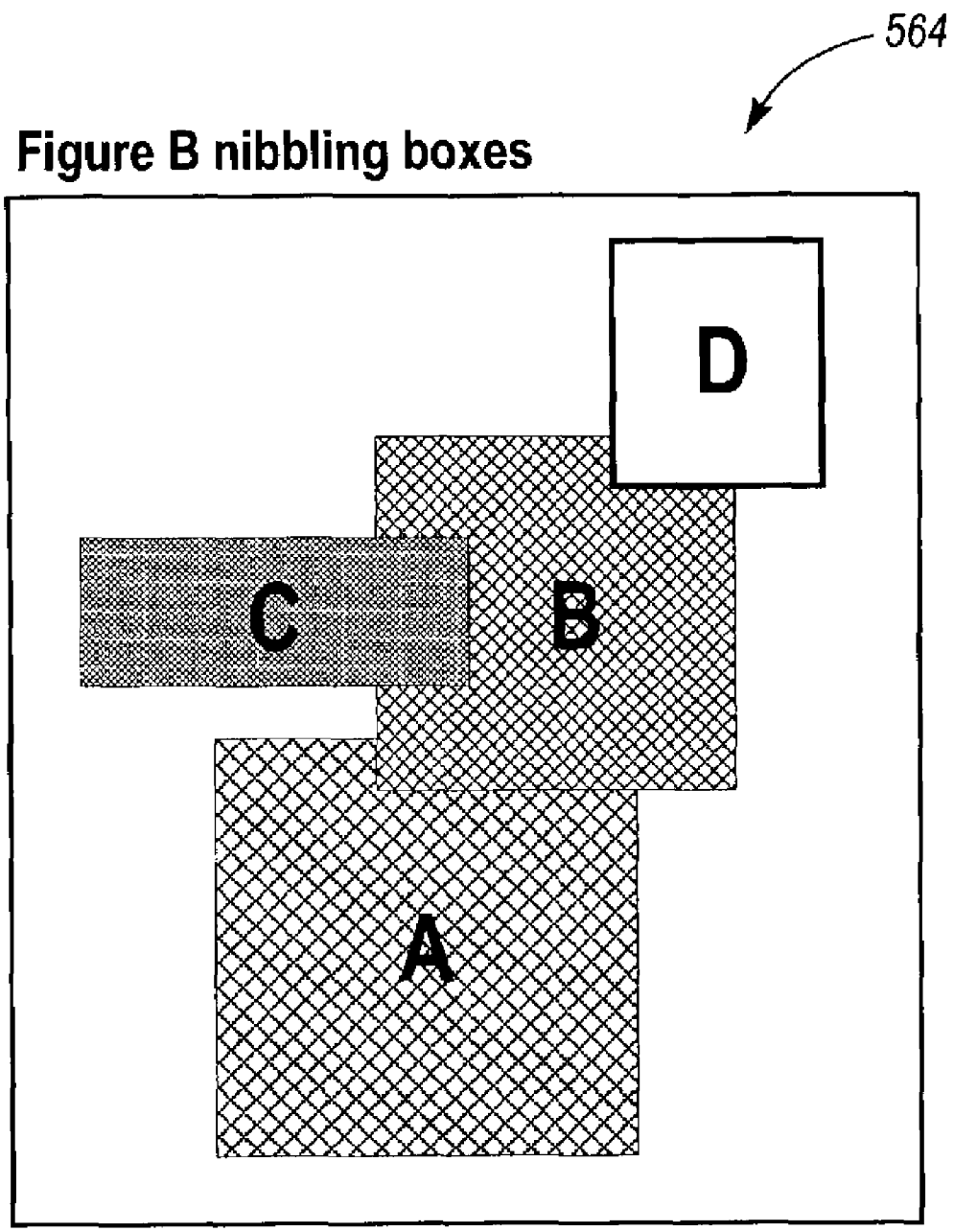
FIG. 10 is an exemplary block diagram showing a first layout of image regions used according to the systems and methods of the invention.

FIG. 10 is an exemplary block diagram showing a first layout of image regions used according to the systems and methods of the invention. As shown in FIG. 10, reordering the pool can allow the same work unit to be reordered more than once. Assuming that the work pool order of is in FIG. 10 is originally ABCD, the first worker thread again selects A to process. When the second worker thread selects work unit C, the second worker thread can reorder the work pool to be ACBD. Additionally, the second worker thread can change the shape of the region associated with work unit B to remove a corner overlapped by the region associated with work unit C. Thus, when the worker 3 now selects a work unit to process, work units B and D are now adjacent, so the worker 3 can select work unit D. The shape for work unit B can also have another portion subtracted to again change the shape of the region. In this embodiment, the original second work unit (C in the example discussed above) can use an opaque color to better facilitate the interaction of commands. Furthermore, if the two work units use the same opaque color, the original first work unit does not have to have its region reshaped. If the region of the work unit chosen in the second pass does not actually overlap its adjacent region, then that work unit can be processed but the adjacent shape does not have to be changed. If the shape for either of the work units under consideration contains bitmap masks, and if reordering the work units would require reshaping, then the work units should not be reordered.

During previous discussions, the term "region" was described to be associated with a particular work unit when determining whether the regions overlapped. However, the region does not have to correspond to the actual shape of the graphic element. Instead, the region can be defined as a bounding box that encompasses the shape of the graphic element. In order to determine whether a worker thread should process a work unit, the worker thread determines if the associated bounding box has a nonempty intersection with a most recently constructed "busy box." The current busy box can be defined as the bounding box of all previously considered shapes of the graphic elements.

Figure 11D:
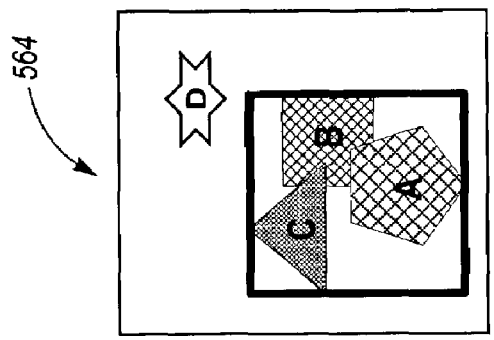
FIGS. 11(a)-(e) are exemplary block diagrams showing a second layout of image regions that can be used according to the systems and methods of the invention.
Figure 11C:
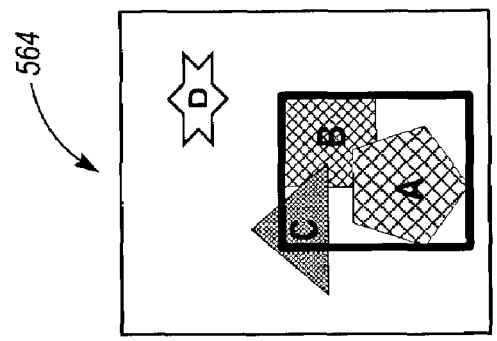
Figure 11B:
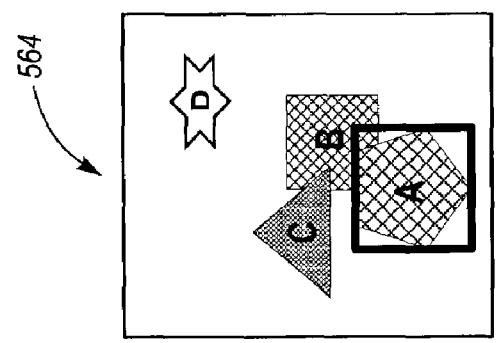
Figure 11A:
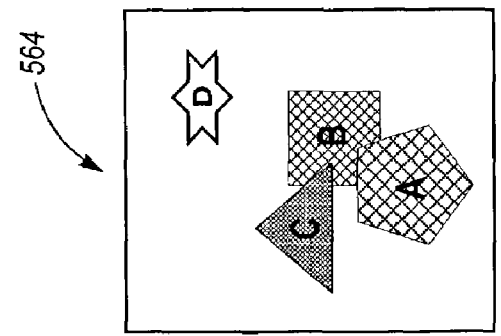

FIGS. 11(a)-(e) are exemplary block diagrams showing a second layout of image regions that can be used according to the systems and methods of the invention. These figures show an alternative page layout that is used to show how the method in accordance with the invention can compute the busy box. With references to both FIGS. 7 and 11(a)-(e), when worker 2 of the worker threads 561 begins searching for a work unit in the work pool, the worker 2 sets the busy box to a value of "0." At this time, the region A associated with work unit A is being processed by the worker 1, so the worker 2 sets the busy box to the bounding box for work unit A's region. The resultant busy box is shown in FIG. 11(b).

The worker 2 now considers work unit B in order to determine whether it can process work unit B. The worker 2 compares the bounding box for the graphic element of work unit B to the current busy box set for the graphic element of work unit A. If the graphic element for work unit B has a bounding box that is completely outside the busy box shown in FIG. 11(b), the worker 2 selects work unit B. However, as shown in FIG. 11(b), the graphic element associated with work unit B is not completely outside of the busy box. Therefore, the worker 2 establishes a new busy box that is defined by a bounding box of the regions associated with work units A and B, as shown in FIG. 11(c).

Figure 11E:
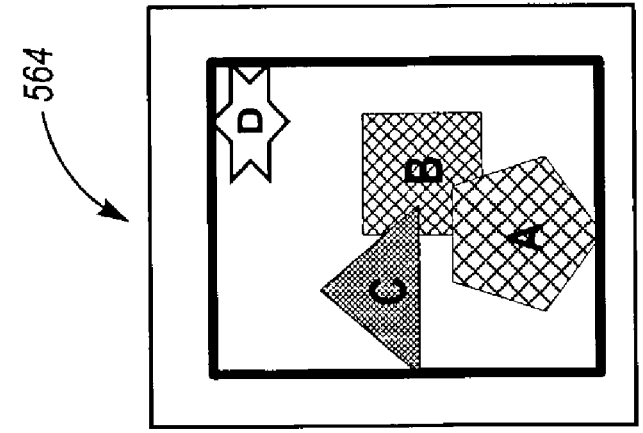

Next, the worker 2 considers work unit C by comparing the new busy box defined by the bounding box of the regions associated with work units A and B with the bounding box of the graphic element associated with work unit C. With this comparison, the worker 2 determines that the graphic element associated with the work unit C overlaps the new busy box. Subsequently, worker 2 again updates the busy box as shown in FIG. 11(d). Finally, worker 2 compares the bounding box for the graphic element associated with work unit D with the updated busy box shown in FIG. 11(d) and determines that the graphic element associated with work unit D has a bounding box that is completely outside the updated busy box shown in FIG. 11(d). Thus, worker 2 determines that it can process the work unit D. The worker 2 creates a final busy box as shown in FIG. 11(e) and stores this final busy box for future processing.

Figure 12B:
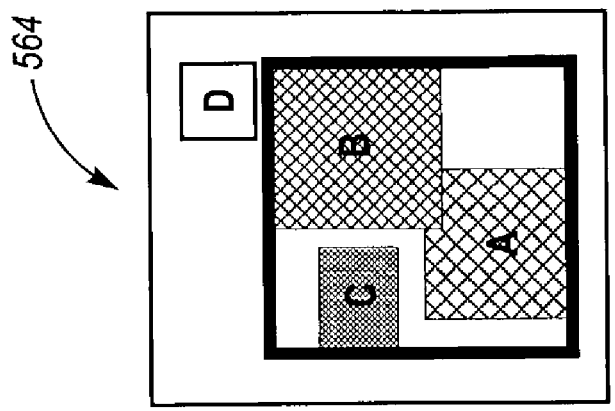
FIGS. 12(a)-(b) show exemplary diagrams of a third layout of image regions that can be used according to the systems and methods of the invention.
Figure 12A:
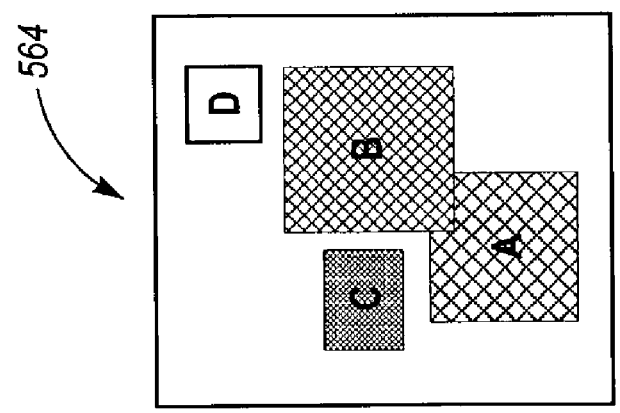

FIGS. 12(a)-(b) show exemplary diagrams of a third layout of image regions that can be used according to the systems and methods of the invention. With these layouts, a particular worker can compare a bounding box to a current busy box, and not to some more complex shape built up from previously considered regions. Considering the same ordering of the work pool and method discussed using FIGS. 11(a)-(d), the worker 2 would select the work unit C to process after considering the work unit B because, in reality, the graphic element associated with the work unit C does not overlap either graphic element associated with the work unit A or work unit B. However, with this method according to the various exemplary embodiments of the invention, after the worker 2 considers the work unit B, the worker 2 sets the busy box as shown in FIG. 12(b). Thus, as can be seen in FIG. 12(b), the graphic element associated with the work unit region C falls completely within this busy box, even though region C does not overlap region A or B. Accordingly, the worker 2 does not select the work unit C to process during a first pass through the work units A-D. Instead, worker 2 selects work unit D to process. However, when worker 3 considers which work unit A-D to process, the worker 3 selects work unit C on second pass.

When a worker thread picks a unit, it stores the current busy box information so that the multithreaded device interface 562 can use the information to coordinate tasking. As previously discussed, the multithreaded device interface 562 only wakes up a sleeping worker thread if it is obvious that a newly-added work unit can be processed immediately. The multithreaded device interface 562 uses the stored busy box to make that determination and wakes up a sleeping worker thread only if the bounding box of the new work unit is completely outside the current busy box. Therefore, referring back to FIG. 12(b), after the worker 2 decides to work on work unit D, the worker 2 stores the busy box as shown in FIG. 12(b) as a "hint" to the multithreaded device interface 562 device to facilitate the coordination of tasking. A worker can also store the busy-box information if the worker does not find any tasking to perform on a given page.

Figure 13:
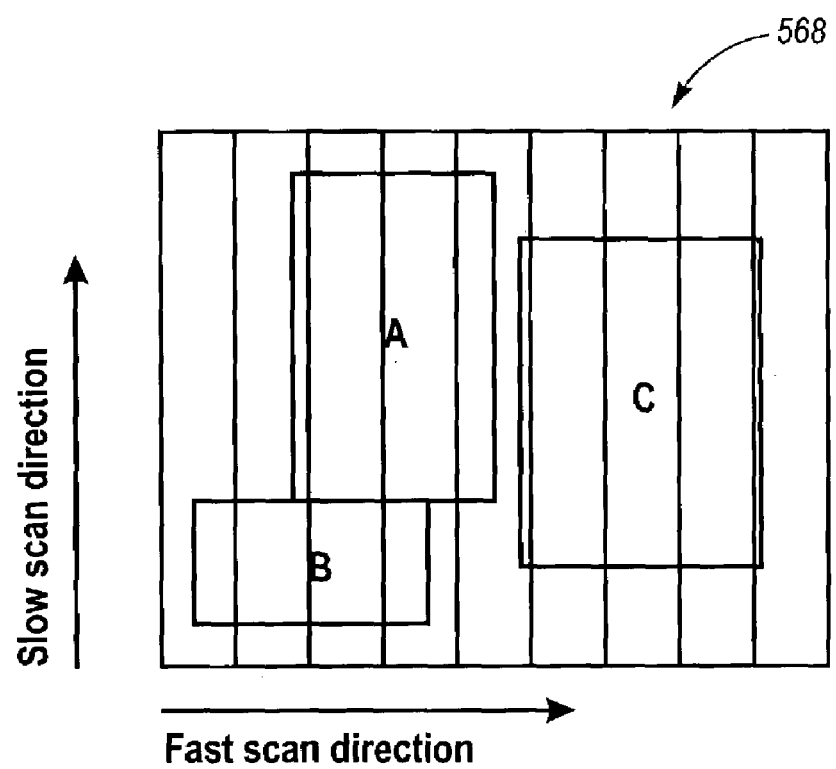
FIG. 13 is an exemplary block diagram showing second overlap regions that can be created according to the systems and methods of the invention.

FIG. 13 is an exemplary block diagram showing second overlap regions that can be created according to the systems and methods of the invention. As previously discussed, the methods can use the notion of overlapping bounding boxes to determine when two work units can be processed in parallel. However, it may not be possible in some instances to process two shapes that do not overlap, but are merely very close to each other. Thus, in order to perform an approximation, the worker threads can write a page buffer one word of memory at a time and one scanline after another in the fast scan direction. In this method, a word may represent multiple pixels (the exact number per word depends on the type of buffer). As shown in FIG. 13, even though regions A and C do not actually overlap, they may contain pixels stored in the same word of memory. Because the worker threads may update the word of memory using, for example, a non-atomic read/modify/write sequence, incorrect results may occur if multiple threads are allowed to access a given word. As shown in FIG. 13, those two regions cannot be processed in parallel.

In order to solve this problem, the various exemplary embodiments according to the invention can expound the bounding box a small amount in the fast scan direction before it determines busy boxes. This process is necessary only in the fast scan direction, and not in the slow scan direction, because the regions are stored one scanline after another. For this reason, pixels that appear to be adjacent but are on different scanlines are actually not close enough to each other in memory. Thus, in FIG. 13, regions A and B can be imaged in parallel. However, because A and C cannot be imaged in parallel (since A and C contain pixels stored in the same word of memory), the method can expound the bounding box of work units A or C in the fast scan direction so that the bounding boxes of work units A and C can be imaged in parallel.

While the invention has been described with reference to one of the preferred embodiments thereof, it is to be understood that the invention is not limited to the preferred embodiments or constructions. To the contrary, the invention is intended to various modifications and equivalent arrangements. In addition, while the various elements of the preferred embodiments are shown in various combinations and configurations, which are exemplary, other combinations and configurations, including more, less or only a single element, are also within the spirit and scope of the invention.

What is claimed is:

1. An imaging system that uses multiple processors to process a print job to display an image, comprising:
   an input device that inputs an object;
   a controller that controls the multiple processors to process the image based on the inputted object to create the print job;
   an interface device that produces a plurality of worker threads that process a plurality of work units associated with regions of a same page within the print job; and
   an output device that displays the image, wherein
   the controller controls the multiple processors and the interface device to search for a plurality of searched work units among the plurality of work units that can be processed simultaneously, and to allow the plurality of worker threads to simultaneously process the searched work units of the same page within the print job, and
   when the controller searches for the plurality of searched work units and determines that a region of a first work unit overlaps another region of a second work unit, all other worker threads disregard the first work unit and search for a third work unit different from the first and second work units.

2. The imaging system according to claim 1, further comprising a decomposer that interprets commands associated with the print job.

3. The imaging system according to claim 1, wherein the controller controls the multiple processors and the interface device to allow the plurality of worker threads to simultaneously process the searched work units of the same page based on color separation between the worker threads.

4. The imaging system according to claim 2, further comprising the controller controlling the plurality of worker threads to remove the searched work units associated with regions of the same page from within worker lists.

5. The imaging system according to claim 1, wherein if any worker thread determines that there are no regions associated with the third work units that do not overlap, the said worker thread processes all of the plurality of work units in order to determine if two adjacent regions associated with the first and second work units exist that are not currently being processed.

6. The imaging system according to claim 5, wherein if the controller determines that two adjacent regions of the first and second work units exist that are not currently being processed, then the controller controls the at least one of the worker threads to reorder a sequence of the searched work units so as to process at least one of the first and second work unit simultaneously with the third work unit.

7. The imaging system according to claim 6, further comprising the controller changing a shape of the region associated with at least one of the first and second work units so that an overlapping portion of the region is eliminated, and then processing the at least one of the first and second work units as the searched work units.

8. An imaging method that uses multiple processors to process a print job to display an image, comprising:
   inputting an object;
   controlling the multiple processors to process the image based on the inputted object to create the print job;
   producing, by an interface device, a plurality of worker threads that process a plurality of work units associated with regions of a same page within the print job;
   controlling the multiple processors and the interface device to allow one of the plurality of worker threads to execute a command associated with a region of the same page within the print job, while another one of the plurality of worker threads simultaneously executes another command associated with another region of the same page; and
   displaying the image to an output device, wherein
   the interface device and the multiple processors search for a plurality of searched work units among the plurality of the work units that can be processed simultaneously, and allow the plurality of worker threads to simultaneously process searched work units of the same page within the print job, and
   when the controller searches for the plurality of searched work units and determines that a region of a first work unit overlaps another region of a second work unit, all other worker threads disregard the first work unit and search for a third work unit different from the first and second work units.

9. The imaging method according to claim 8, further comprising interpreting commands associated with the print job.

10. The imaging method according to claim 8, wherein the multiple processors and the interface device allow the plurality of worker threads to simultaneously process the searched work units of the same page based on color separation between the worker threads.

11. The imaging method according claim 8 further comprising removing the searched work units associated with regions of the same page from within the worker lists.

12. The imaging method according claim 8, further comprising:
   determining if there are any work units associated with regions that do not overlap; and
   if it is determined that all of the regions associated with the work units overlap, then determining if two adjacent regions of the first and second work units exist that are not currently being processed.

13. The imaging method according to claim 12, further comprising,
   if it is determined that two adjacent regions of the first and second work units exist that are not currently being processed, then reordering a sequence of the searched work units so as to process at least one of the first and second work unit simultaneously with the third work unit that do not overlap.

14. The imaging method according to claim 13, further comprising changing a shape associated with at least one of the regions associated with the first or second work units so that an overlapping portion of the at least one of the regions is eliminated, and then processing the at least one of the regions associated with the first or second work unit as the searched work unit.

* * * * *

UNITED STATES PATENT AND TRADEMARK OFFICE
CERTIFICATE OF CORRECTION

PATENT NO. : 7,436,531 B2  
APPLICATION NO. : 10/248610  
DATED : October 14, 2008  
INVENTOR(S) : Michael F. Plass and Timothy S. Diebert Page 1 of 1

It is certified that error appears in the above-identified patent and that said Letters Patent is hereby corrected as shown below:

Title Page  
Please delete the following:

Item (73) Assignee: Xerox Corporation, Norwalk, CT (US);

And replace with:

Item (73) Assignee: Palo Alto Research Center Incorporated, Palo Alto, CA (US)

Signed and Sealed this

Twentieth Day of October, 2009

David J. Kappos  
*Director of the United States Patent and Trademark Office*